(12) United States Patent
Kumar et al.

(10) Patent No.: US 11,195,507 B2
(45) Date of Patent: Dec. 7, 2021

(54) TRANSLATING BETWEEN SPOKEN LANGUAGES WITH EMOTION IN AUDIO AND VIDEO MEDIA STREAMS

(71) Applicant: Rovi Guides, Inc., San Jose, CA (US)

(72) Inventors: Vijay Kumar, Bangalore (IN); Rajendran Pichaimurthy, Karnataka (IN); Madhusudhan Seetharam, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 134 days.

(21) Appl. No.: 16/152,017

(22) Filed: Oct. 4, 2018

(65) Prior Publication Data
US 2020/0111474 A1     Apr. 9, 2020

(51) Int. Cl.
| | |
|---|---|
| *G10L 13/033* | (2013.01) |
| *G10L 25/63* | (2013.01) |
| *G06F 40/40* | (2020.01) |
| *G10L 13/027* | (2013.01) |
| *G10L 15/07* | (2013.01) |

(Continued)

(52) U.S. Cl.
CPC .......... *G10L 13/027* (2013.01); *G10L 15/07* (2013.01); *G10L 15/19* (2013.01); *G10L 25/63* (2013.01); *H04N 21/8106* (2013.01)

(58) Field of Classification Search
CPC ... G10L 13/033; G10L 13/0335; G10L 13/08; G10L 13/086; G10L 15/005; G10L 15/26; G10L 17/005; G10L 21/0356; G10L 25/57; G10L 25/63; G06F 40/40; G06F 40/47; G06F 40/58

USPC ...... 704/2, 3, 7, 8, 258, 260, 266, 268, 269, 704/277
See application file for complete search history.

(56) References Cited

U.S. PATENT DOCUMENTS

| | | | | |
|---|---|---|---|---|
| 4,964,044 A | * | 10/1990 | Kumano ................. | G06F 40/55 704/6 |
| 6,463,404 B1 | * | 10/2002 | Appleby ................. | G06F 40/55 704/9 |

(Continued)

OTHER PUBLICATIONS

Akagi, et al., "Emotional Speech Recognition and Synthesis in Multiple Languages toward Affective Speech-to-Speech Translation System," Acoustic Information Science Laboratory, School of Information Science, Japan Advanced Institute of Science and Technology (2014) (10 pages).

*Primary Examiner* — Martin Lerner
(74) *Attorney, Agent, or Firm* — Haley Guiliano LLP (57) ABSTRACT

Systems and methods are described herein for generating alternate audio for a media stream. The media system receives media that is requested by the user. The media comprises a video and audio. The audio includes words spoken in a first language. The media system stores the received media in a buffer as it is received. The media system separates the audio from the buffered media and determines an emotional state expressed by spoken words of the first language. The media system translates the words spoken in the first language into words spoken in a second language. Using the translated words of the second language, the media system synthesizes speech having the emotional state previously determined. The media system then retrieves the video of the received media from the buffer and synchronizes the synthesized speech with the video to generate the media content in a second language.

22 Claims, 7 Drawing Sheets

(51) Int. Cl.
*G10L 15/19* (2013.01)
*H04N 21/81* (2011.01)

(56) References Cited

U.S. PATENT DOCUMENTS

| | | | | |
|---|---|---|---|---|
| 6,665,644 | B1* | 12/2003 | Kanevsky | G10L 17/26 704/246 |
| 7,761,892 | B2 | 7/2010 | Ellis | |
| 9,106,812 | B1* | 8/2015 | Price | G10L 13/027 |
| 9,552,807 | B2* | 1/2017 | Rossano | G10L 13/033 |
| 10,424,288 | B2* | 9/2019 | Barari | G10L 13/033 |
| 10,930,263 | B1* | 2/2021 | Mahyar | G10L 13/033 |
| 2002/0091509 | A1* | 7/2002 | Zoarez | G06F 40/279 704/6 |
| 2003/0216922 | A1* | 11/2003 | Gonzales | G06F 40/58 704/260 |
| 2005/0033760 | A1 | 2/2005 | Fuller | G06F 16/58 |
| 2008/0109845 | A1* | 5/2008 | Hengel | G10L 13/00 725/36 |
| 2010/0138209 | A1* | 6/2010 | Harrenstien | G06F 40/58 704/2 |
| 2011/0184721 | A1* | 7/2011 | Subramanian | G10L 19/0018 704/4 |
| 2011/0319160 | A1* | 12/2011 | Arn | A63F 13/814 463/30 |
| 2012/0069974 | A1* | 3/2012 | Zhu | G10L 13/00 379/88.14 |
| 2012/0078607 | A1* | 3/2012 | Sumita | G06F 40/58 704/2 |
| 2012/0226500 | A1* | 9/2012 | Balasubramanian | G10L 13/033 704/260 |
| 2014/0019135 | A1* | 1/2014 | Talwar | G10L 13/033 704/260 |
| 2014/0278404 | A1* | 9/2014 | Holmes | G10L 13/033 704/235 |
| 2015/0073770 | A1* | 3/2015 | Pulz | G06F 40/58 704/3 |
| 2016/0021334 | A1* | 1/2016 | Rossano | G10L 13/033 704/2 |
| 2016/0048508 | A1* | 2/2016 | Dalce | G10L 13/02 704/2 |
| 2016/0098395 | A1* | 4/2016 | DuBose | G10L 13/00 704/2 |
| 2016/0236097 | A1* | 8/2016 | Sullivan | A63F 13/358 |
| 2017/0372693 | A1* | 12/2017 | Rangarajan Sridhar | G10L 15/04 |
| 2018/0182373 | A1* | 6/2018 | Almudafar-Depeyrot | G10L 13/00 |
| 2018/0277142 | A1* | 9/2018 | Veeramani | G10L 15/26 |
| 2018/0286412 | A1* | 10/2018 | Amsterdam | G10L 17/06 |
| 2018/0314689 | A1* | 11/2018 | Wang | G10L 15/22 |
| 2019/0244623 | A1* | 8/2019 | Hall | G10L 15/005 |
| 2020/0012724 | A1* | 1/2020 | Kawatake | G10L 13/043 |
| 2020/0058289 | A1* | 2/2020 | Gabryjelski | G10L 13/00 |

* cited by examiner

TRANSLATING BETWEEN SPOKEN LANGUAGES WITH EMOTION IN AUDIO AND VIDEO MEDIA STREAMS

BACKGROUND OF THE INVENTION

The present disclosure is directed to generating alternate audio for a media stream, and more particularly to translating the audio from a first language to a second language.

SUMMARY

The advancement of digital transmission of media content has led to easy access of media content across the world. The rapid growth of the internet has enabled users in one part of the world to access content generated in a different part of the world at a moment's notice. Consequently, the language of the content may not be a language native to the user. This prevents users from accessing content from a different language. Conventional systems may be able to provide some form of translation for the query but are unable to accurately capture emotions of the dialogues spoken in the first language. Emotion of the spoken words in media is crucial in the holistic experience of media content. For example, when watching a television show like the Oscars, someone who does not speak English may not fully understand the emotion of the speeches made by the actors if a machine simply reads translations of the speech from closed captioning text provided. This deprives the user of a holistic experience of watching the show just because the user is unable to speak English.

Systems and methods are described herein for generating alternate audio for a media stream. In one embodiment, a media system receives media that is requested by the user. The media comprises a video and audio. The audio includes words spoken in a first language. The media system stores the received media in a buffer as it is received. The media system separates the audio from the buffered media to begin the translation process, and determines an emotional state expressed by spoken words of the first language. The media system translates the words spoken in the first language into words spoken in a second language. Using the translated words of the second language, the media system synthesizes speech having the emotional state previously determined. The media system then retrieves the video of the received media from the buffer and synchronizes the synthesized speech with the video to generate the media content in a second language that is presented to the user.

For example, the user requests to watch a broadcast of the "Oscars". Being a native Spanish speaker, the user would prefer the "Oscars" translated from English to Spanish. The media system buffers a portion of the stream of the "Oscars", and extracts the audio of the portion of the stream from the buffer, the media system determines the emotions expressed by a speaker during that portion of the "Oscars". The media system translates the audio from English to Spanish. When synthesizing speech for the translated audio, the media system adds the emotion to the translated words. The media system then combines the generated speech with the video of the Oscar stream, from the buffer, and presents it to the user.

In order to determine the emotional state expressed by the spoken words, the media system determines whether the spoken words contain words that are emotion identifiers (e.g., Happy, Sad, Ecstatic, Elated, Upset). The emotion identifiers are basic indicators of emotions that may be expressed in the spoken words and are used to easily determine an emotional state of the speaker. The determined emotion state is used in synthesizing the speech using the translated words.

Alternatively, the media system determines emotional state by determining a plurality of non-linguistic characteristics associated with the spoken words. Non-linguistic characteristics include, but are not limited to, pitch, timbre, tone, accent, rhythm, and volume. The presence of a combination of these characteristics in the audio may point to a particular emotional state. The media system may determine that the person speaking on screen is "Happy" by analyzing at the non-linguistic characteristics. People speaking different languages express emotion differently. Thus, emotions in different languages, may have different non-linguistic characteristics associated with different emotions. In the above example, the non-linguistic characteristic of a happy American person ("Tom Hanks") may be very different from the non-linguistic characteristics of a happy Spanish person. Because the spoken words are being translated to Spanish, the media system may synthesize the speech using the non-linguistic characteristics of the happy Spanish person.

Similarly, non-linguistic characteristics may vary based on gender. Men and women have different voice characteristics in different languages. Using the example above, Spanish Men and American Men may have different non-linguistic characteristics. When synthesizing the speech, the media system may also use non-linguistic characteristics to the translated spoken words based on gender.

Non-linguistic characteristics may also vary based on ethnicity. Different people from different parts of the same country speaking the same language may have different non-linguistic characteristics. For example, people from Boston have different non-linguistic characteristics from people in Texas. The media system may assign non-linguistic characteristics to the translated words based on ethnicity of the speaker to synthesize the translated speech.

The non-linguistic characteristics are also helpful in generating voice samples of the speaker. When speaking, everyone has different voice characteristics that are very helpful in identifying people. Associating the right voice characteristics to the translated words improves the experience of the user watching the media. In some cases, the speakers may be famous people (e.g., "Tom Hanks") and the media system may generate a voice sample of the famous person by analyzing speeches or movies of Tom Hanks. In some cases, the media system may just generate a voice sample using the determined non-linguistic characteristics. The generated voice sample is then combined with the translated spoken words to synthesize speech in the second language.

BRIEF DESCRIPTION OF DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
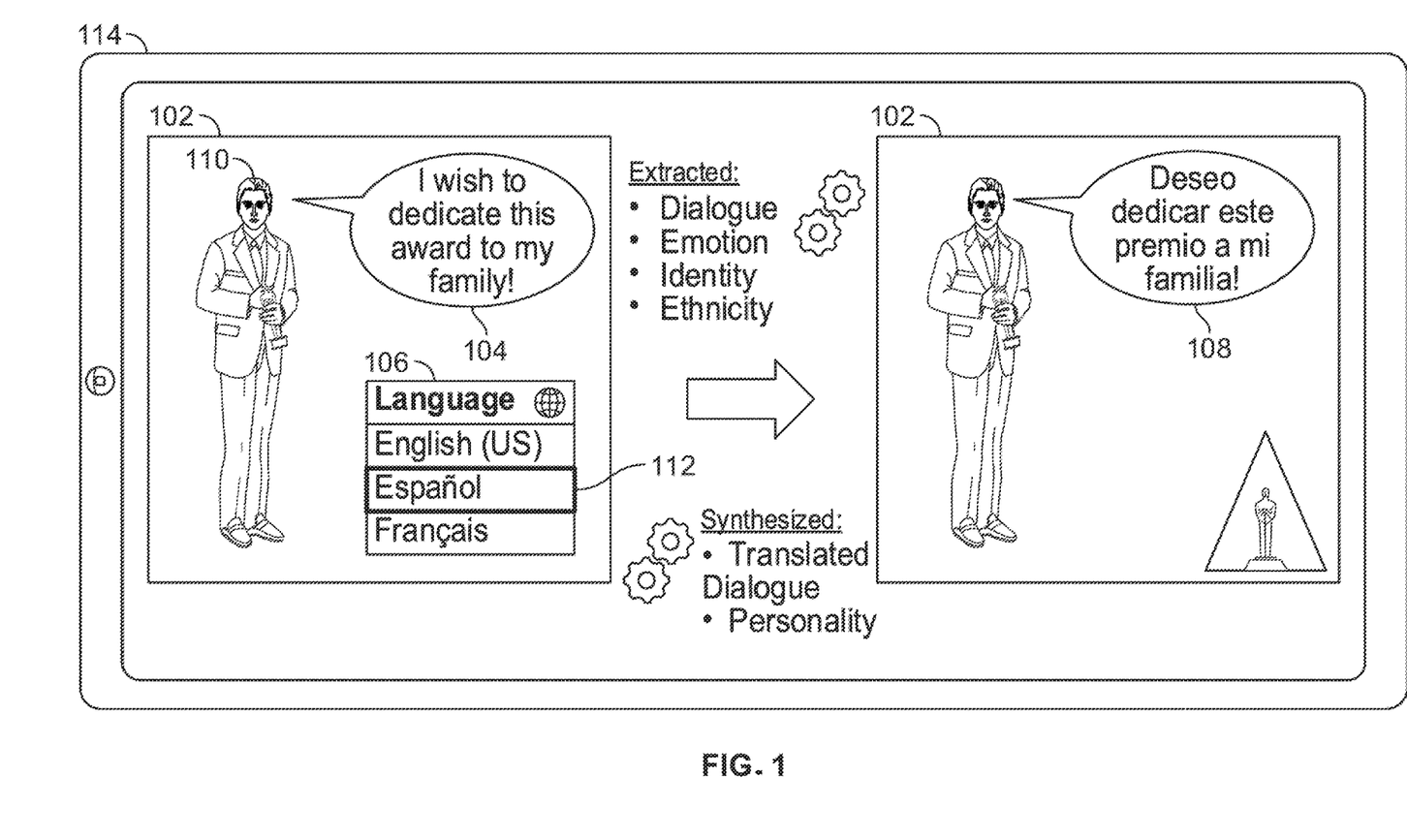
FIG. 1 shows an illustrative example for generating alternate audio for a media stream, in accordance with some embodiments of the disclosure.

FIG. 1 shows an illustrative example for generating alternate audio for a media stream, in accordance with some embodiments of the disclosure. Consider scenario where a user is watching a broadcast of a media asset (e.g., "Oscars") on display 102 of a user device 114. In scenario, a media system may be installed on the user device 114. However, it should be noted that the media system may instead be present on a remote server that can communicate with the user device 114.

The broadcast of the "Oscars" is in English. While watching the broadcast of the "Oscars", the user, not being a native English speaker, may wish to change the language of the audio from English to a language that the user is more comfortable with. The user is able to access a "Language" menu 106 via an interface of the media system to access a plurality of languages that the audio of the broadcast program may be rendered into. In FIG. 1, the "Language" menu 106 includes 3 languages "English (US)", "Español" and "Français." This representation of the "Language" menu is for exemplary purposes only. In some embodiments, the media system is able to provide audio in many more languages that are not displayed in "Language" menu 106. Using the user interface of the media system, the user highlights Español using a selection box 112 to begin translation of the audio of the "Oscars" into Spanish.

The media system stores a portion of the received broadcast of the "Oscars" in a buffer. The media system extracts the audio of the "Oscars" from the buffer and translates the spoken words of the audio from English to a second language ("Spanish"). In FIG. 1, an actor 110 is delivering an acceptance speech. The identity of actor 110 delivering the speech may be determined from metadata associated with the portion of the "Oscars" that is received along with the portion of the "Oscars" stored in the buffer. The portion of the "Oscars" stored in the buffer may contain a part of the acceptance speech. The audio component of the part of speech contains the spoken words 104 "I wish to dedicate this award to my family." The media translates the sentence of the spoken words 104 from English to Spanish. The Spanish translation of the spoken words 104 is "Deseo dedicar este premio a mi familia!" 108. The media system translates the spoken words 104 by analyzing the grammar rules of English, and Spanish. The process of translation of the words from a first language to a second language is described in further detail in FIGS. 5 and 6.

However, the translation of the spoken words 104 of the speech delivered by actor 110 ("Tom Hanks") is not sufficient. To complete the viewing experience of the user, the translated spoken words 108 are rendered using vocal characteristics of actor 110 ("Tom Hanks"). This makes it seem like actor 110 ("Tom Hanks") is delivering the speech in Spanish himself.

Part of determining vocal characteristics is determining an emotion state of "Tom Hanks" while he delivers the speech. The emotion state may be determined using a plurality of non-linguistic characteristics associated with the speech. Non-linguistic characteristics include, for example volume, pitch, timbre, tone, accent, and rhythm. The media system is able to determine these characteristics for actor 110 from the part of the speech derived from the audio stored in the buffer.

In an exemplary setting, the range of pitch of human voice is from low C2 to a high D6 (in scientific notation). The media system may use the audio from the part of the speech stored in the buffer to determine a pitch of the actor 110. In this example, the media system may determine a pitch of actor 110 in the audio to be C3. The media system may contain a language translation database that links a plurality of linguistic characteristics to a plurality of emotions. In this example, the emotion of "Happy" may be linked with a pitch of C3. So, using the determined pitch of the audio of 110, the media system determines that the actor 110 is "Happy" in the portion of the "Oscars" stored at the buffer. Similarly, the media system is able to determine other non-linguistic characteristics from the audio stored at the buffer. In some embodiments, the media system may calculate a combined score of a plurality of non-linguistic characteristics and link the combined score to an emotion. The combined score may be compared to a range of scores computed based on the non-linguistic characteristics stored in the language translation database.

The language translation database may also classify non-linguistic characteristics based on different criteria, for example gender and ethnicity. For example, female voices are typically divided into three groups, namely, soprano, mezzo-soprano, and contralto. Male voices are usually divided into four groups: countertenor, tenor, baritone, and bass. Within each of these major categories, subcategories identify specific vocal qualities such as coloratura facility and vocal weight to differentiate between voices. The language translation database of the media system may store baseline non-linguistic characteristics for each type of voice. Similarly, people from different geographical regions may have varied non-linguistic characteristics. The language translation database of the media system may store different linguistic characteristics for people from different parts of the world, for example, Asia, Middle East, South America, North America, Europe. In some embodiments, the non-linguistic characteristics may also be divided based on sub regions. For example, in Asia, people from India, China, and Russia have very different non-linguistic characteristics. In such embodiments, the language translation database may store different linguistic characteristics for each region. In some embodiments, the classification of non-linguistic characteristics may be based on accents of the same language.

For example, English spoken in Boston sounds different from English spoken in Atlanta and both sound very different from English spoken in California.

In FIG. 1, the media system may determine a voice type of the actor 110 to be "baritone". The media system may determine non-linguistic characteristics associated with the "baritone" from the language translation database. Because the audio is being translated from English to Spanish, the baseline characteristics may be modified based on linguistic characteristics associated with Spanish speakers. In some embodiments, the baseline non-linguistic characteristics may be modified using characteristics of people from South America, or Mexico.

In some embodiments, the media system may determine an emotion state based on the spoken words. For example, if the spoken words 104 include words like "Happy", "Upset", "Elated", "Disappointed", the media system is able retrieve an emotion associated with the spoken words from the language translation database. The language translation database may then retrieve non-linguistic characteristics associated with the emotion, which are then used to synthesize speech in the alternate language.

Synthesis of speech in the alternate language includes assembling the translated spoken words 108 with the non-linguistic characteristics. The media system may generate an alternate audio track by assigning the determined non-linguistic characteristics to the translated spoken words 108. The media system synchronizes the alternate audio track with the video present in the buffer. The synchronization of the alternate audio track with the video includes mapping the words spoken with the lip movements of the actor 110. The synchronized audio and video signals are then presented to display 102 of user device 114. As depicted in FIG. 1, the translated spoken words 108 with appropriate non-linguistic characteristics is presented to the user.

Figure 2:
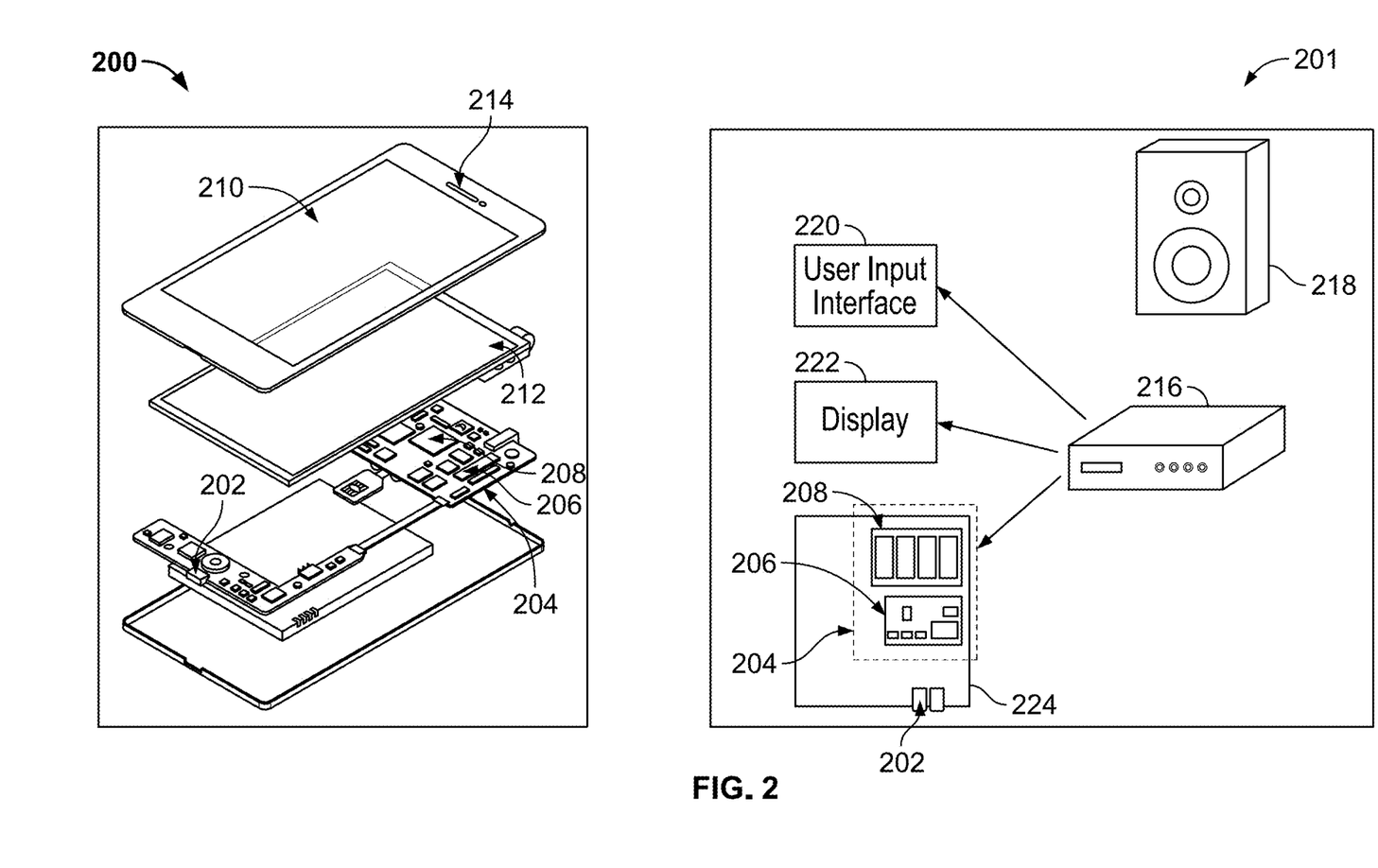
FIG. 2 is a diagram of an illustrative user equipment device, in accordance with some embodiments of the disclosure.

FIG. 2 shows a generalized embodiment of illustrative media devices 200 and 201. As depicted, media device 200 may be a smartphone or tablet, whereas media device 201 may be a home media system that includes equipment device 216 (e.g., a set-top box, CPU, video-game console, etc.) powered by processor 224. Media devices 200 and 201 may receive content and data via input/output (hereinafter "I/O") path 202. I/O path 202 may provide content (e.g., broadcast programming, on-demand programming, Internet content, content available over a local area network (LAN) or wide area network (WAN), and/or other content) and data to control circuitry 204, which includes processing circuitry 206 and storage 208. Control circuitry 204 may be used to send and receive commands, requests, and other suitable data using I/O path 202. I/O path 202 may connect control circuitry 204 (and specifically processing circuitry 206) to one or more communications paths (described below). I/O functions may be provided by one or more of these communications paths but are shown as a single path in FIG. 2 to avoid overcomplicating the drawing.

Control circuitry 204 may be based on any suitable processing circuitry such as processing circuitry 206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 204 executes instructions for a media system stored in memory (i.e., storage 208). Specifically, control circuitry 204 may be instructed by the media system to perform the functions discussed above and below.

In client-server-based embodiments, control circuitry 204 may include communications circuitry suitable for communicating with a media system server or other networks or servers. The instructions for carrying out the above-mentioned functionality may be stored on a server. Communications circuitry may include a cable modem, an integrated service digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of media devices, or communication of media devices in locations remote from each other.

As referred to herein, the phrase "media device" and "user device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a personal computer (PC), a laptop computer, a tablet, a WebTV box, a smart phone, or any other television equipment, computing equipment, or wireless device, and/or combination of the same.

Memory may be an electronic storage device provided as storage 208 that is part of control circuitry 204. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Non-volatile memory may also be used (e.g., to launch a boot-up routine and other instructions). Cloud-based storage, described in relation to FIG. 3, may be used to supplement storage 208 or instead of storage 208.

Control circuitry 204 may include audio circuitry, video circuitry, and tuning circuitry, such as one or more analog tuners, one or more MP4 decoders or other digital decoding circuitry, or any other suitable tuning or audio circuits or combinations of such circuits. Encoding circuitry (e.g., for converting over-the-air, analog, or digital signals to audio signals for storage) may also be provided. Control circuitry 204 may also include scaler circuitry for upconverting and downconverting content into the preferred output format of the user equipment 200. Circuitry 204 may also include digital-to-analog converter circuitry and analog-to-digital converter circuitry for converting between digital and analog signals. The tuning and encoding circuitry may be used by the media device to receive and to display, to play, or to record content. The tuning and encoding circuitry may also be used to receive guidance data. The circuitry described herein, including for example, the tuning, audio generating, encoding, decoding, encrypting, decrypting, scaler, and analog/digital circuitry, may be implemented using software running on one or more general purpose or specialized processors. Multiple tuners may be provided to handle simultaneous tuning functions. If storage 208 is provided as a separate device from user equipment 200, the tuning and encoding circuitry (including multiple tuners) may be associated with storage 208.

A user may send instructions to control circuitry 204 using user input interface 210 of media device 200 or user input interface 220 of media device 201. User input interface 210 and user input interface 220 may be any suitable user interface, such as a remote control, mouse, trackball, keypad, keyboard, touch screen, touchpad, stylus input, joystick, voice recognition interface, or other user input interfaces. Display 210 may be a touchscreen or touch-sensitive display. In such circumstances, user input interface 210 may be integrated with or combined with display 212. Display 222 may be provided as a stand-alone device or integrated with other elements of media device 201. Speakers 214 may be provided as integrated with other elements of media device 200. In the case of media device 201, speakers 218 may be stand-alone units (e.g., smart speakers). The audio component of videos and other content displayed on display 222 may be played through speakers 218. In some embodiments, the audio may be distributed to a receiver (not shown), which processes and outputs the audio via speakers 218.

Figure 3:
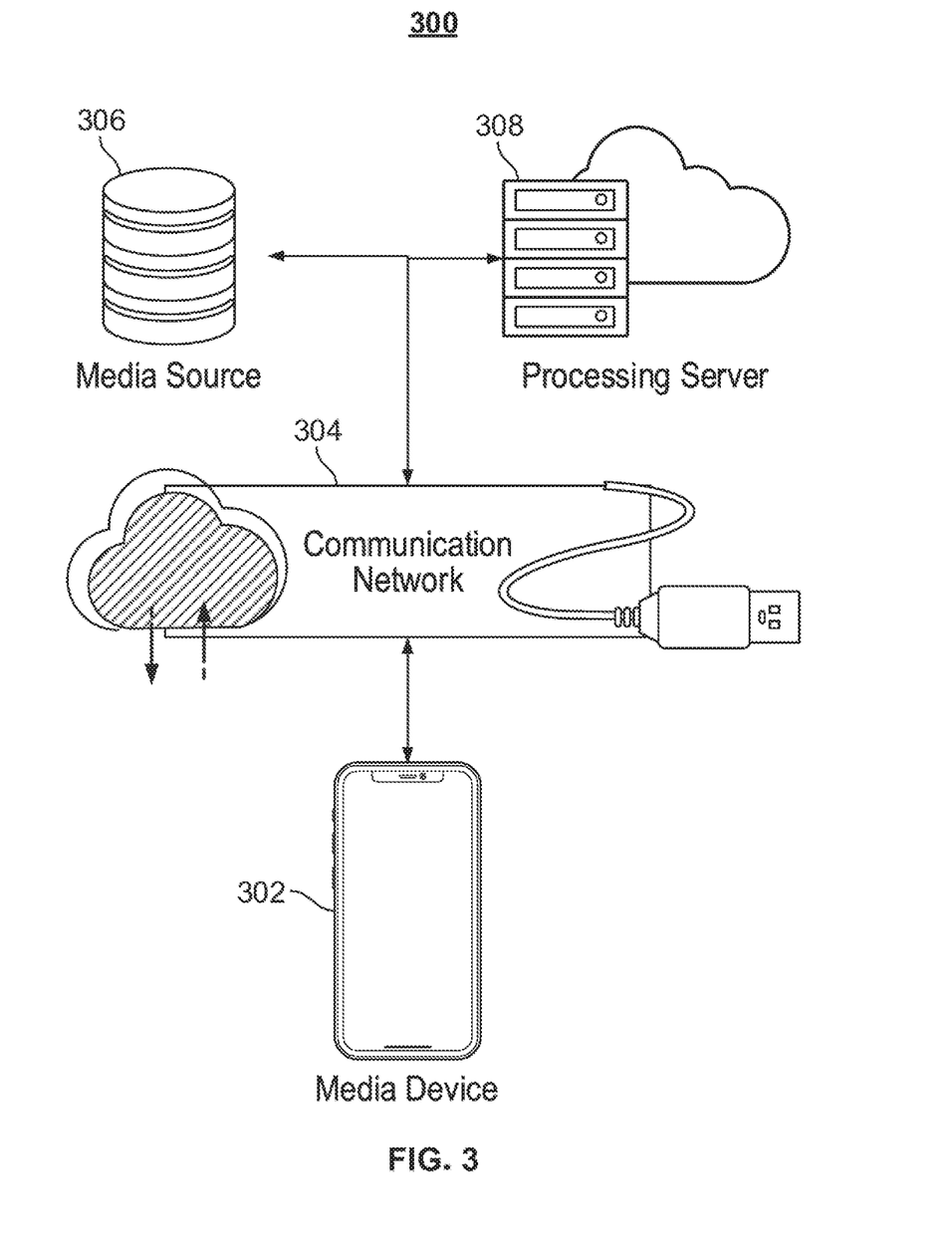
FIG. 3 is a diagram of an illustrative media system, in accordance with some embodiments of the disclosure.

Media device 200 and media device 201 of FIG. 2 can be implemented in system 300 of FIG. 3 as media device 302. Media devices, on which a media system may be implemented, may function as a standalone device or may be part of a network of devices. Various network configurations of devices may be implemented and are discussed in more detail below.

In system 300, there may be multiple media devices but only one is shown in FIG. 3 to avoid overcomplicating the drawing. In addition, each user may utilize more than one type of media device and also more than one of each type of media device.

Media device 302 may be coupled to communication network 304. Communication network 304 may be one or more networks including the Internet, a mobile phone network, mobile voice or data network (e.g., a 4G or LTE network), cable network, public switched telephone network, or other types of communications network or combinations of communications networks. Media source 306, processing server 308, and media device 302 may be coupled to communication network 304 via one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths.

Although communications paths are not drawn between media device 302, media source 306 and processing server 308, these devices may communicate directly with each other via communication paths, such as short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The media devices may also communicate with each other through an indirect path via communication network 304.

System 300 includes media source 306 coupled to communication network 304. There may be more than one of media source 306, but only one is shown in FIG. 3 to avoid overcomplicating the drawing. Media source 306 may include one or more types of content distribution equipment including a television distribution facility, cable system headend, satellite distribution facility, programming sources (e.g., television broadcasters, etc.), intermediate distribution facilities and/or servers, Internet providers, on-demand media servers, and other content providers. Media source 306 may be the originator of content (e.g., a television broadcaster, a Webcast provider, etc.) or may not be the originator of content (e.g., an on-demand content provider, an Internet provider of content of broadcast programs for downloading, etc.). Media source 306 may include cable sources, satellite providers, on-demand providers, Internet providers, over-the-top content providers, or other providers of content. Media source 306 may also include a remote media server used to store different types of content (including video content selected by a user), in a location remote from any of the media devices. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety. Media source 306 may also provide metadata.

Media systems may be, for example, stand-alone applications implemented on media devices. For example, the media system may be implemented as software or a set of executable instructions which may be stored in storage 208 and executed by control circuitry 204 of a media device 302. In some embodiments, media systems may be client-server applications where only a client application resides on the media device, and server application resides on processing server 308. For example, media systems may be implemented partially as a client application on control circuitry 204 of media device 302 and partially on processing server 308 as a server application running on control circuitry of processing server 308. When executed by control circuitry of processing server 308, the media system may instruct the control circuitry to generate the media system output (e.g., synthesized speech) and transmit the generated output to media device 302. The server application may instruct the control circuitry of the media source 306 to transmit metadata for storage on media device 302. The client application may instruct control circuitry of the receiving media device 302 to generate the media system output.

Media device 302 may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." Cloud resources may be accessed by media device 302 using, for example, a web browser, a media system, a desktop application, a mobile application, and/or any combination of access applications of the same. Media device 302 may be a cloud client that relies on cloud computing for application delivery, or the media device may have some functionality without access to cloud resources. For example, some applications running on media device 302 may be cloud applications, i.e., applications delivered as a service over the Internet, while other applications may be stored and run on the media device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, media devices can use cloud resources for processing operations such as the processing operations performed by processing circuitry described in relation to FIG. 2.

Figure 4:
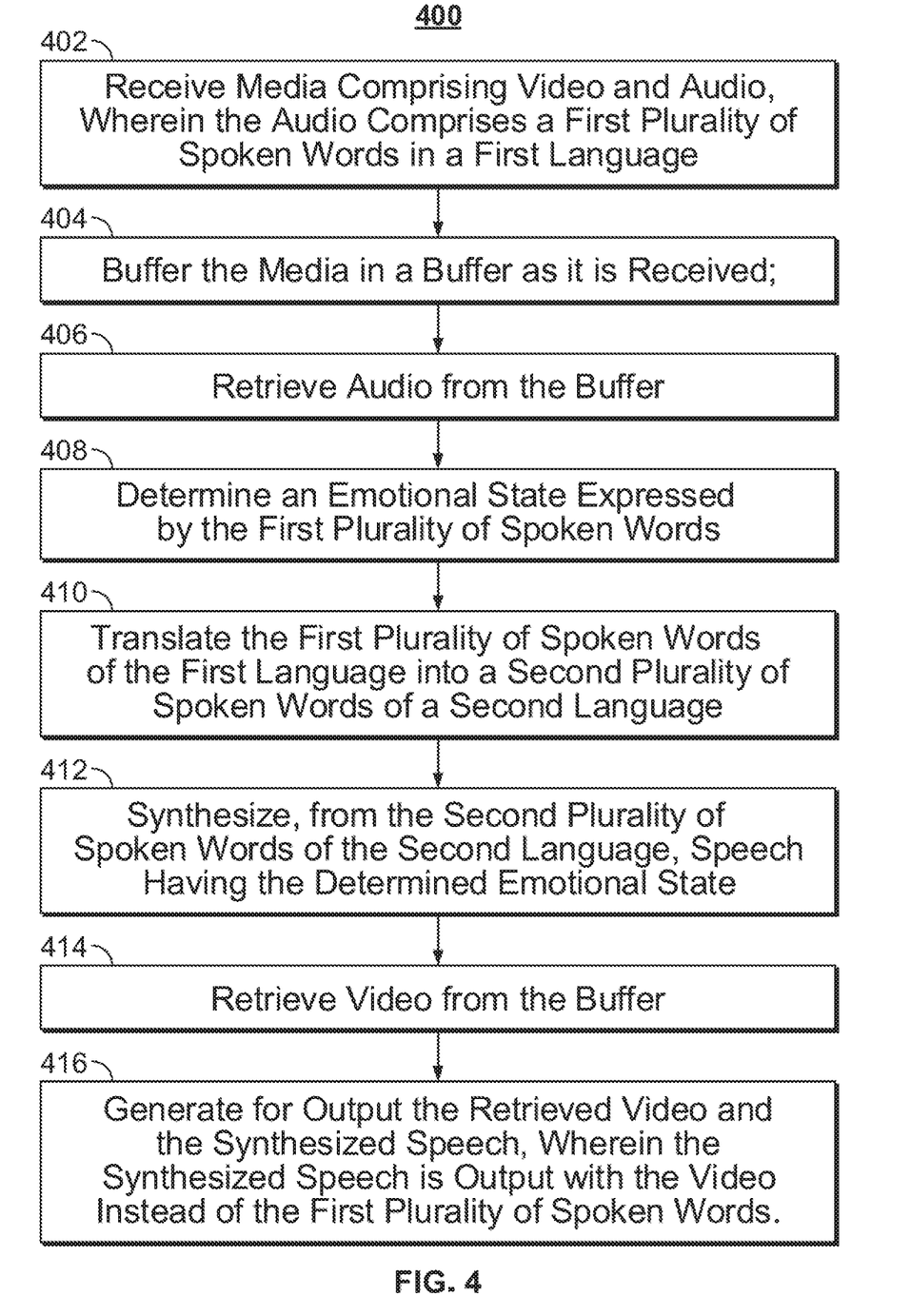
FIG. 4 is a flowchart of a detailed illustrative process for generating alternate audio for a media stream, in accordance with some embodiments of the disclosure.

FIG. 4 is a flowchart of a detailed illustrative process for generating alternate audio for a media stream, in accordance with some embodiments of the disclosure. Many elements of process 400 have been described above with respect to FIG. 1, and those descriptions have full force and effect with respect to the below description of process 400, and thus details on previously-described elements are omitted for the sake of brevity.

At 402, control circuitry 204 receives media comprising video and audio, wherein the audio comprises a first plurality of spoken words in a first language. It should be noted that control circuitry 204 may be on media device 302, or a local device coupled to the media device (e.g., a router), or a server that can intercept notification data and communicate with the media device (e.g., processing server 308), or any suitable combination thereof. In the latter two cases control circuitry 204 may receive the media to be delivered to the media device 302 from a content source 306. In the former case, media device 302, the media system may receive data directly from the source (e.g., media source 306).

For example, the user requests to access a media asset, (e.g., "Oscars") on media device 302. Control circuitry 204 may provide a broadcast of the "Oscars" for display on display 222 of the media device 302. The media asset "Oscars" includes a video component and an audio component. As the "Oscars" are broadcast in English, the audio component of the "Oscars" contains words spoken in English.

At 404, control circuitry 204 buffers the media in a buffer as it is received. The control circuitry 204 may periodically receive a portion of the media asset ("Oscars") from media source 306. The received portion of the media asset may be stored in a buffer in storage 208 before it is displayed on display 222 of media device 302. In some embodiments, the control circuitry 204 receives the entire broadcast program in advance once from media source 306. In such embodiments, the control circuitry 204 is able to store the entire received broadcast program in the buffer in storage 208 before the broadcast program is provided to display 222 of media device 302.

At 406, control circuitry 204 retrieves audio from the buffer. The control circuitry 204 begins processing the received portion of the media stored in the buffer by parsing the stored portion of the broadcast program ("Oscars") to separate the video component and the audio component. In some embodiments, the control circuitry may use audio processing circuitry and video processing circuitry to separate the audio component and video component. The control circuitry 204 separates the audio component in order to replace the audio component with audio in an alternate language after translating the audio from a first language ("English") to a second language ("Spanish").

At 408, control circuitry 204, determines an emotional state expressed by the first plurality of spoken words. The translation of audio from a first language to a second language includes ensuring that the emotional state of the speaker is accurately represented in the translated version of the audio. The emotional state expressed by the first plurality of spoken words reflects the emotional state of the speaker of the words.

In the example of the "Oscars", the emotional state of the first plurality of spoken words 104 represents an emotional state of the speaker actor 110 (shown in FIG. 1). The control circuitry 204 is able to determine, from the audio component of the broadcast program, a plurality of non-linguistic characteristics that assist in determining an emotional state of the speaker. Non-linguistic characteristics, as described in FIG. 1 include properties like pitch, timbre, volume, tone. In some embodiments, these characteristics are combined to form a score that helps identify an emotional state associated with the speaker. In some embodiments, control circuitry 204 is able to parse the text of the audio component to determine whether the text contains emotional identifiers, that include words that describe emotions, like "Happy", "Sad", "Overjoyed", "Thankful" among others. Each of these emotions may have non-linguistic characteristics associated with them. The emotions and the non-linguistic characteristics associated with the emotions may be stored at a language translation database in storage 208 of control circuitry 204.

At 410, control circuitry 410 translates the first plurality of spoken words of the first language into a second plurality of spoken words of a second language. The control circuitry 204 uses rules of grammar of the first language ("English") and second language ("Spanish") to translate of spoken words from the English to the second language ("Spanish"). The process of translating words is described in further detail in FIGS. 5-6.

At 412, control circuitry 204 synthesizes, from the second plurality of spoken words of the second language, speech having the determined emotional state. The process of synthesizing speech may include a) using a text-to-speech software to read the translated words from 410, and b) modifying the voice of the text-to-speech software to emulate emotions of the speaker determined in 408. Audio processing circuitry of control circuitry 204 may include text-to-speech capability which is synthesize speech by using the determined non-linguistic characteristics of the emotional state.

At 414, control circuitry 204 retrieves video from the buffer. At 416, control circuitry 204 generates for output the retrieved video and the synthesized speech, wherein the synthesized speech is output with the video instead of the first plurality of spoken words.

Once the speech is synthesized in the second language, the control circuitry retrieves the video component from the broadcast program ("Oscars") from the buffer and synchronizes the synthesized speech with the video component. The synchronization of the synthesized speech with the video includes mapping the speech to meet the lip movements of the speaker. In some embodiments, the control circuitry 204 is able to determine a start time and an end time of the speech in the first language in the in the media asset. Additionally, the control circuitry 204 also determines whether there were significant pauses in the speech, like maybe when the actor 110 got emotional and did not say anything for a few seconds. The audio processing circuitry of control circuitry 204 determines a start time, end time of the pauses in the speech. The audio processing circuitry of control circuitry 204 inserts the pauses at the relevant times in the spoken words of the second language to generate synthesized speech, and then combines the synthesized speech with the video for the display.

Figure 5:
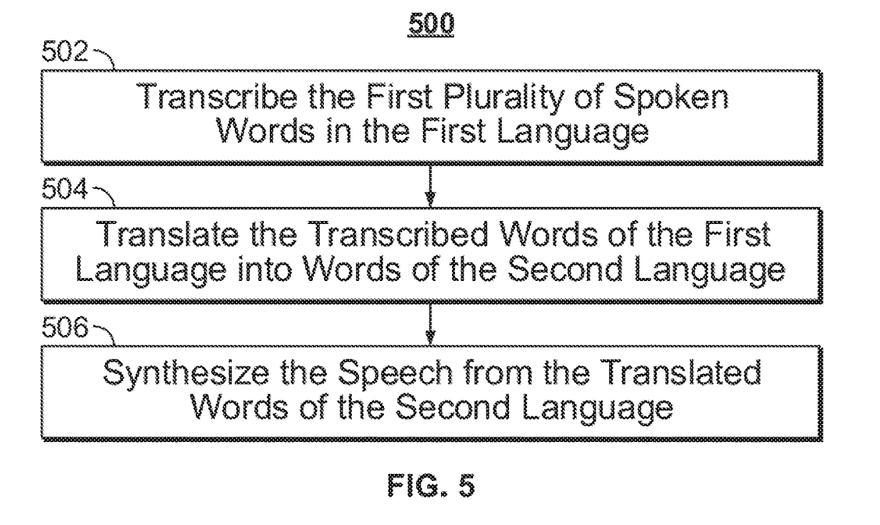
FIG. 5 is a flowchart of a detailed illustrative process for translating the first plurality of spoken words into the second plurality of spoken words of the second language, in accordance with some embodiments of the disclosure.

FIG. 5 is a flowchart of a detailed illustrative process for translating the first plurality of spoken words into the second plurality of spoken words of the second language, in accordance with some embodiments of the disclosure. Many elements of process 500 have been described above with respect to FIG. 1, and those descriptions have full force and effect with respect to the below description of process 500, and thus details on previously-described elements are omitted for the sake of brevity.

At 502, control circuitry 204 transcribes the first plurality of spoken words in the first language. Control circuitry 204 includes audio processing circuitry that contains speech-to-text software that is able to transcribe the spoken words of the audio component in the buffer. As depicted in FIG. 1, the spoken words by actor 110 are "I dedicate this award to my family!" The speech-to-text software of audio processing circuitry of control circuitry 204 is able to convert the spoken words from the audio component stored in the buffer to text in a first language ("English").

At 504, control circuitry 204 translates the transcribed words of the first language into words of the second language. The audio processing circuitry of control circuitry 204 performs the translation using the grammar rules from the first language ("English") and the second language ("Spanish"). The process of translation is described in more detail in FIG. 6.

At 506, control circuitry 204 synthesizes speech from the translated words of the second language. The process of synthesizing speech using translated words is described in more detail in FIG. 4.

Figure 6:
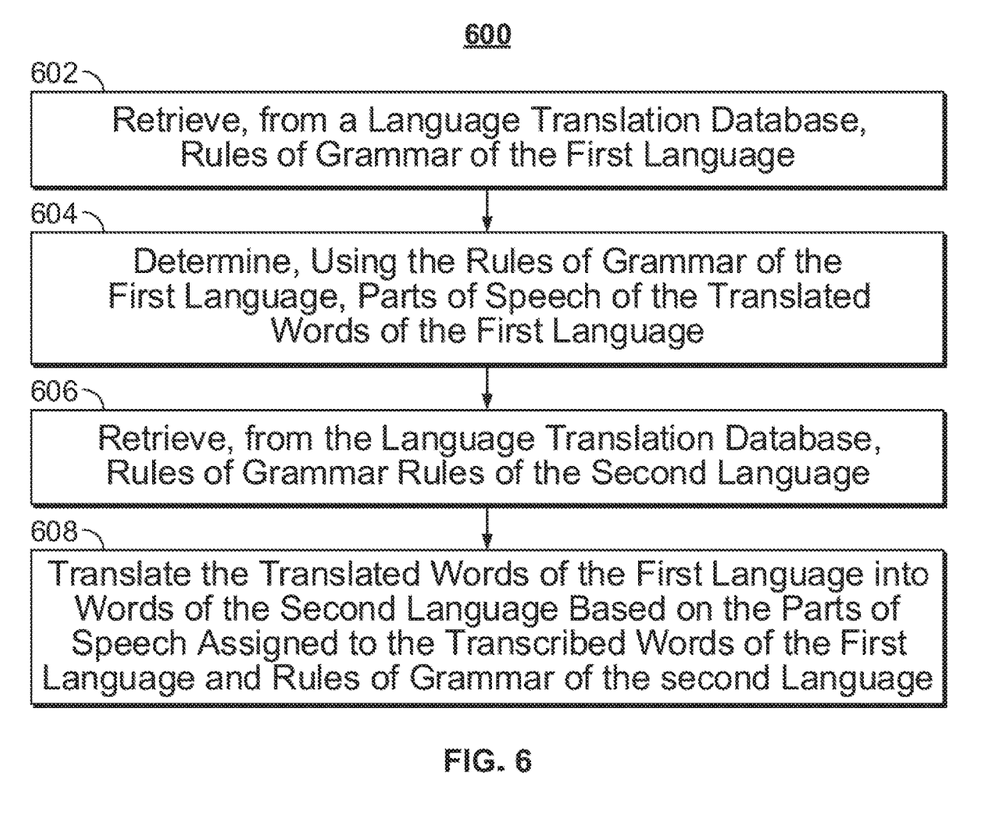
FIG. 6 is a flowchart of a detailed illustrative process for translating the transcribed words of the first language into words of the second language, in accordance with some embodiments of the disclosure.

FIG. 6 is a flowchart of a detailed illustrative process for translating the transcribed words of the first language into words of the second language, in accordance with some embodiments of the disclosure. Many elements of process 600 have been described above with respect to FIG. 1, and those descriptions have full force and effect with respect to the below description of process 600, and thus details on previously-described elements are omitted for the sake of brevity.

At 602, control circuitry 204 retrieves, from a language translation database, rules of grammar of the first language. In some embodiments, the standard rules of grammar of various languages are stored at the language translation database. In some embodiments, the language translation database retrieves standard rules of grammar for various languages from the internet over communication network 304. For example, on detecting that the first language is "English", control circuitry 204 retrieves rules of grammar for English from language translation database.

At 604, control circuitry 204 determines, using the rules of grammar of the first language, parts of speech of the translated words of the first language. Every language has different parts of speech, like noun, pronoun, adjective, determiner, verb, adverb, preposition, conjunction, and interjection. Every sentence in any language, is composed of some or more of these parts of speech. Control circuitry 204 is able to identify different parts of speech of the spoken words 104. For example, in the spoken words 104 "I want to dedicate this award to my family!", "I" is a noun, "want to dedicate" is verb, "this award" is another noun, and "family" is object of the verb.

At 606, control circuitry 204 retrieves, from the language translation database, rules of grammar rules of the second language. Similar to rules of grammar of "English", control circuitry 204 retrieves basic rules of grammar of the second language "Spanish" from the language translation database. In some embodiments, if the basic rules of grammar are not stored in the language translation database, control circuitry 204 may retrieve the rules from the internet over communication network 304.

At 608, control circuitry 204 translates the translated words of the first language into words of the second language based on the parts of speech assigned to the transcribed words of the first language and rules of grammar of the second language.

In the example described above, the sentence to be translated in English is "I want to dedicate this award to my family!" From this sentence, using the basic rules of English grammar, control circuitry 204 determines that "I" is a noun, "want to dedicate" is a verb, "this award" is another noun, and "family" is an object of the verb. Control circuitry 204 translates each word into its Spanish counterpart. The Spanish translation of "I" is "yo", "want to dedicate" is "quiero dedicar", "this award" is "este premio", and "to my family" is "a mi familia". Now, using the rules of Spanish grammar, control circuitry 204 assembles the translated words into a sentence in the form of spoken words "Deseo dedicar este premio a mi familia!" 108 as depicted in FIG. 1.

Figure 7:
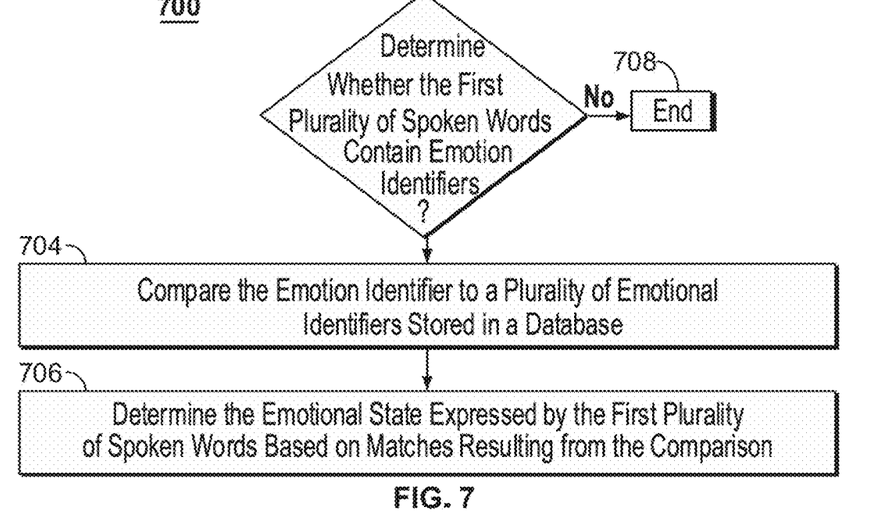
FIG. 7 is a flowchart of a detailed illustrative process for determining whether the spoken words contain emotion identifiers, in accordance with some embodiments of the disclosure.

FIG. 7 is a flowchart of a detailed illustrative process for determining whether the spoken words contain emotion identifiers, in accordance with some embodiments of the disclosure. Many elements of process 700 have been described above with respect to FIG. 1, and those descriptions have full force and effect with respect to the below description of process 700, and thus details on previously-described elements are omitted for the sake of brevity. In some embodiments, step 408 of flowchart 400 is accomplished using process 700 described in FIG. 7.

At decision block 702, control circuitry 204 determines whether the first plurality of spoken words contains emotion identifiers. In some embodiments, control circuitry 204, after transcribing the first plurality of spoken words (as described in FIG. 5), may analyze the transcribed words to determine whether the transcribed words include words that include emotional identifiers. Emotional identifiers may include, for example, "happy", "sad" "unhappy", "elated", "thankful". In response to determining that the first plurality of spoken words includes emotional identifiers, control circuitry 204 proceeds process 700 to 704 to compare the emotional identifier to a plurality of emotional identifiers stored in a database. In response to determining that the first plurality of spoken words do not include emotional identifiers, control circuitry 204 proceeds process 700 to End at 708.

At 704, control circuitry 204 compares the emotional identifier to a plurality of emotional identifiers stored in a database. As described above, control circuitry 204 may include a language translation database. The language translation database may relate emotion identifiers to emotions in the language translation database. For example, a speaker says, "I am very happy today." Control circuitry 204 may determine that the spoken words contain the word "happy" which is an emotional identifier.

At 706, control circuitry 204 determine the emotional state expressed by the first plurality of spoken words based on matches resulting from the comparison. Using the emotional identifier "happy" retrieved from the spoken words, the control circuitry 204 may determine an emotion expressed by the speaker in the spoken words. The determined emotion is then used to synthesize speech as described in FIG. 4.

Figure 8:
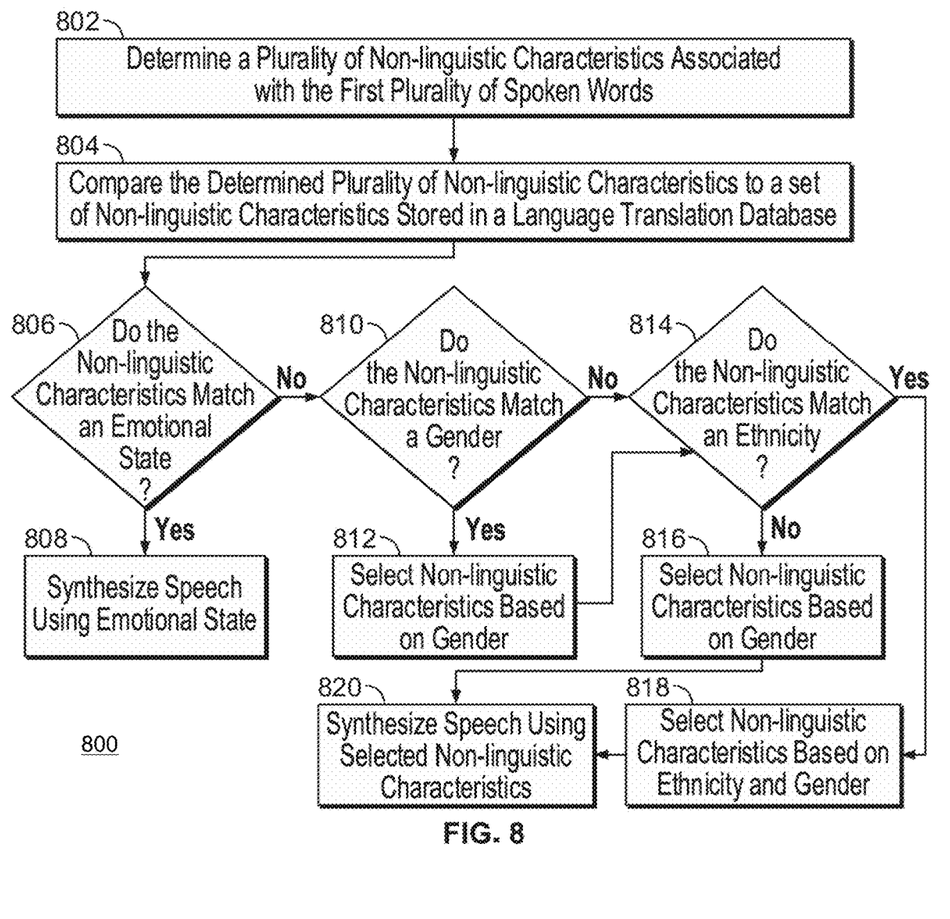
FIG. 8 is a flowchart of a detailed illustrative process for determining non-linguistic characteristics of spoken words based on emotional state, gender, or ethnicity, in accordance with some embodiments of the disclosure.

FIG. 8 is a flowchart of a detailed illustrative process for determining non-linguistic characteristics of spoken words based on emotional state, gender, or ethnicity, in accordance with some embodiments of the disclosure. Many elements of process 800 have been described above with respect to FIG. 1, and those descriptions have full force and effect with respect to the below description of process 800, and thus details on previously-described elements are omitted for the sake of brevity.

At 802, control circuitry 204 determines a plurality of non-linguistic characteristics associated with the first plurality of spoken words. As described in FIG. 1, control circuitry 204 may use the audio from the part of the speech stored in the buffer to determine a pitch of the actor 110. In this example, the control circuitry 204 may determine a pitch of actor 110 in the audio to be C3. The media system may contain a language translation database that links a plurality of linguistic characteristics to a plurality of emotions. Similarly, the media system is able to determine other non-linguistic characteristics from the audio stored at the buffer. In some embodiments, the control circuitry 204 may calculate a combined score of a plurality of non-linguistic characteristics.

At 804, control circuitry 204 compares the determined plurality of non-linguistic characteristics to a set of non-linguistic characteristics stored in a language translation database. As described in FIG. 1, the language translation database of the control circuitry 204 may store baseline non-linguistic characteristics for different types of voice. Control circuitry 204 compares the determined characteristics to the different non-linguistic characteristics stored in the language translation database.

At decision block 806, control circuitry 204 determines whether the non-linguistic characteristics match an emotional state. In response to determining that the non-linguistic characteristics match an emotional state, control circuitry 204 proceeds process 800 to 808 to synthesize speech using the emotional state. One embodiment of selection of emotional states is described in further detail in FIG. 7.

Additionally, in an exemplary setting, the range of pitch of human voice is from low C2 to a high D6 (in scientific notation). The media system may use the audio from the part of the speech stored in the buffer to determine a pitch of the actor 110. In this example, the media system may determine a pitch of actor 110 in the audio to be C3. The media system may contain a language translation database that links a plurality of non-linguistic characteristics to a plurality of emotions. In this example, the emotion of "Happy" may be linked with a pitch of C3. So, using the determined pitch of the audio of 110, the media system determines that the actor 110 is "Happy" in the portion of the "Oscars" stored at the buffer. Similarly, the media system is able to determine other non-linguistic characteristics from the audio stored at the buffer. In some embodiments, the media system may calculate a combined score of a plurality of non-linguistic characteristics and link the combined score to an emotion. The combined score may be compared to a range of scores computed based on the non-linguistic characteristics stored in the language translation database.

In response to determining that the non-linguistic characteristics does not match an emotional state, control circuitry 204 proceeds process 800 to decision block 810 to determine whether the non-linguistic characteristics match a gender.

In response to determining that the non-linguistic characteristics match a gender, control circuitry 204 proceeds process 800 to 812 to select non-linguistic characteristics based on gender. In some embodiments, the language translation database of the control circuitry 204 may store baseline non-linguistic characteristics for each type of female and male voice. The process of synthesizing the speech may begin with picking the baseline characteristics which may be modified based on other factors. For example, female voices are typically divided into three groups, namely, soprano, mezzo-soprano, and contralto. Male voices are usually divided into four groups: countertenor, tenor, baritone, and bass. Each of these voices may be associated with a set of non-linguistic characteristics respectively. Control circuitry 204 selects the stored non-linguistic characteristics based on the gender of actor 110. Control circuitry 204 may compare the determined non-linguistic characteristics from the audio component of the media asset stored in the buffer to the different set of non-linguistic characteristics of different genders stored in the language translation database. As depicted in FIG. 1, control circuitry 204 may determine a voice type of the actor 110 to be "baritone" based on comparing the non-linguistic characteristics based on the determined non-linguistic characteristics of the audio component stored in the buffer.

At 812, control circuitry 204 selects non-linguistic characteristics based on gender and proceeds process 800 to 814 to determine whether the non-linguistic characteristics match an ethnicity. For example, different people from different parts of the same country speaking the same language may have different non-linguistic characteristics. For example, people from Boston have a different English accent from people in Texas. The language translation database may store baseline non-linguistic characteristics for a multitude of regions. Control circuitry 204 may determine an ethnicity of the speaker using metadata associated with the actor 110 of the media asset. Control circuitry 204 may assign non-linguistic characteristics to the translated words based on the determined ethnicity of the speaker to synthesize the translated speech. As described in FIG. 1, because the spoken words are being translated to Spanish, the media system may synthesize the speech using the non-linguistic characteristics of a native Spanish speaker. In some embodiments, control circuitry 204 is able to modify the non-linguistic characteristics of the baritone determined at 812 to reflect nonlinguistic characteristics of a Spanish man.

At decision block 810, in response to determining that the non-linguistic characteristics do not match a gender at 810, control circuitry 204 proceeds process 800 to decision block 814 to determine whether the non-linguistic characteristics match an ethnicity.

At decision lock 814, in response to determining that the non-linguistic characteristics matches an ethnicity, control circuitry 204 proceeds process 800 to 818 to select non-linguistic characteristics based on gender and ethnicity. In such cases, control circuitry 204 selects non-linguistic characteristics based on gender and ethnicity. As described in FIG. 1, actor 110 "Tom Hanks" has non-linguistic characteristics of a baritone that have to be modified to a Spanish male's vocal characteristics. In such examples, control circuitry 204 uses "Tom Hanks vocal characteristics as a base and modifies the vocal characteristics based on the vocal characteristics of a Spanish male, in order to make it seem like a native Spanish speaker is delivering the spoken words 108.

In response to determining that the non-linguistic characteristics does not match an ethnicity, control circuitry 204 proceeds process 800 to 816 to select non-linguistic characteristics based on gender. In such cases, control circuitry 204 selects non-linguistic characteristics only based on gender. For example, as described in FIG. 1, actor 110 is "Tom Hanks" whose voice has non-linguistic characteristics of a baritone, control circuitry 204 selects non-linguistic characteristics associated with baritone to synthesize the translated speech.

At 820, control circuitry 204 synthesizes speech using selected non-linguistic characteristics. As described in FIG. 1, because the spoken words are being translated to Spanish, the media system may synthesize the speech using the non-linguistic characteristics of a Spanish person. Using the determined non-linguistic characteristics, the control circuitry 204 is able to synthesize speech so that it sounds like a native Spanish speaker is speaking the words instead of an English speaker.

Figure 9:
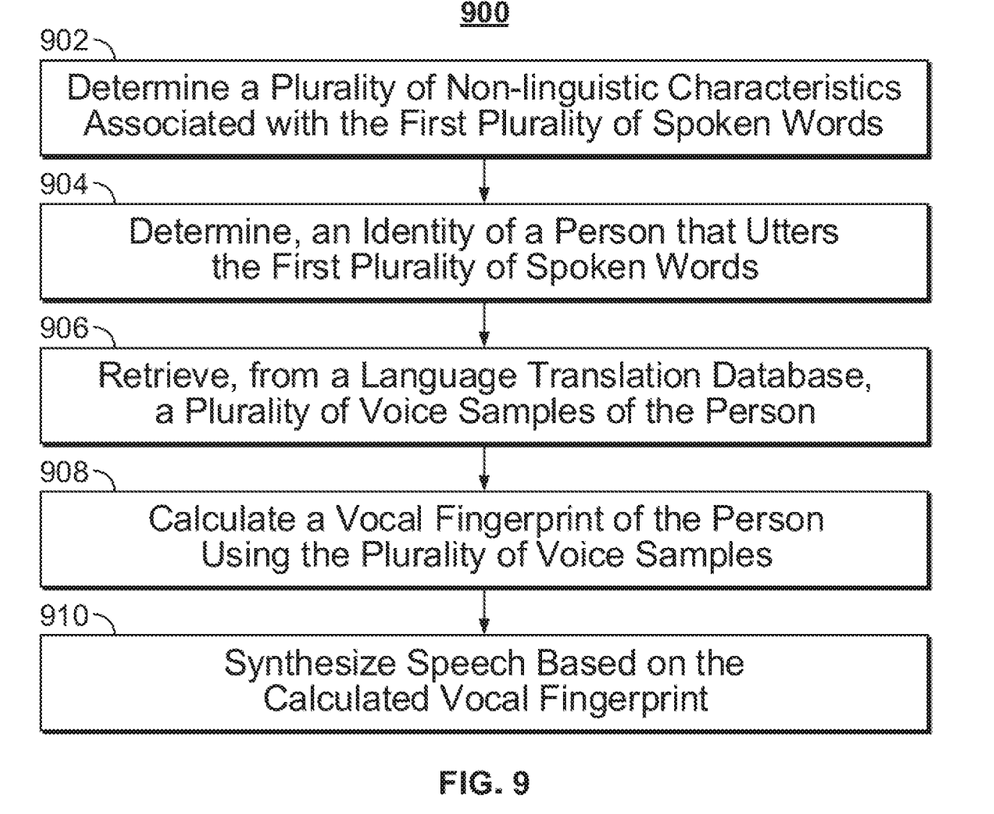
FIG. 9 is a flowchart of a detailed illustrative process for determining a vocal fingerprint based on an identity of a speaker of the first plurality of words, in accordance with some embodiments of the disclosure.

FIG. 9 is a flowchart of a detailed illustrative process for determining a vocal fingerprint based on an identity of a speaker of the first plurality of words, in accordance with some embodiments of the disclosure. Many elements of process 900 have been described above with respect to FIG. 1, and those descriptions have full force and effect with respect to the below description of process 900, and thus details on previously-described elements are omitted for the sake of brevity.

At 902, control circuitry 204 determines a plurality of non-linguistic characteristics associated with the first plurality of spoken words. The determination of non-linguistic characteristics is described in detail in FIGS. 7-8.

At 904, control circuitry 204 determines, an identity of a person that utters the first plurality of spoken words. For example, from metadata associated with the media asset, control circuitry 204 is able to determine an identity of a person speaking. As depicted in FIG. 1, a portion of the media asset is stored in the buffer. The portion of the media asset may also be accompanied with the metadata of the portion of the media asset. From the metadata associated with the portion of the media asset, the control circuitry 204 may determine an identity of people present in the portion of the media asset. From the example in FIG. 1, from the portion of the media asset stored in the buffer, control circuitry 204 is able to determine identity of actor 110 to be "Tom Hanks".

At 906, control circuitry 204 retrieves, from a language translation database, a plurality of voice samples of the person. Using the determined identity of actor 110 ("Tom Hanks"), the control circuitry 204 retrieves a plurality of voice samples associated with the actor 110. Control circuitry 204 may search for voice samples for the actor 110 over the internet. Voice samples may be extracted from other media assets that the actor has been a part of. In the case of "Tom Hanks", the voice samples may be extracted from movies, interviews, and speeches that feature "Tom Hanks". In some embodiments, the determined voice samples may be stored in the language translation database of control circuitry 204 for future use.

At 908, control circuitry 204 calculates a vocal fingerprint of the person using the plurality of voice samples. Using the retrieved voice samples, the control circuitry 204 is able to determine a vocal fingerprint of the actor. A vocal fingerprint may be a condensed digital summary, deterministically generated from an audio signal, that can be used to identify an audio sample. In some embodiments, control circuitry 204 is able to determine a vocal fingerprint that is a condensed representation of the actor's voice.

At 910, control circuitry 204 synthesizes speech based on the calculated vocal fingerprint. Using the determined vocal fingerprint, control circuitry 204 is able to synthesize the speech. The vocal fingerprint is able to impart accurate vocal representations of the actor 110 to the translated words, while synthesizing speech in the second language.

Figure 10:
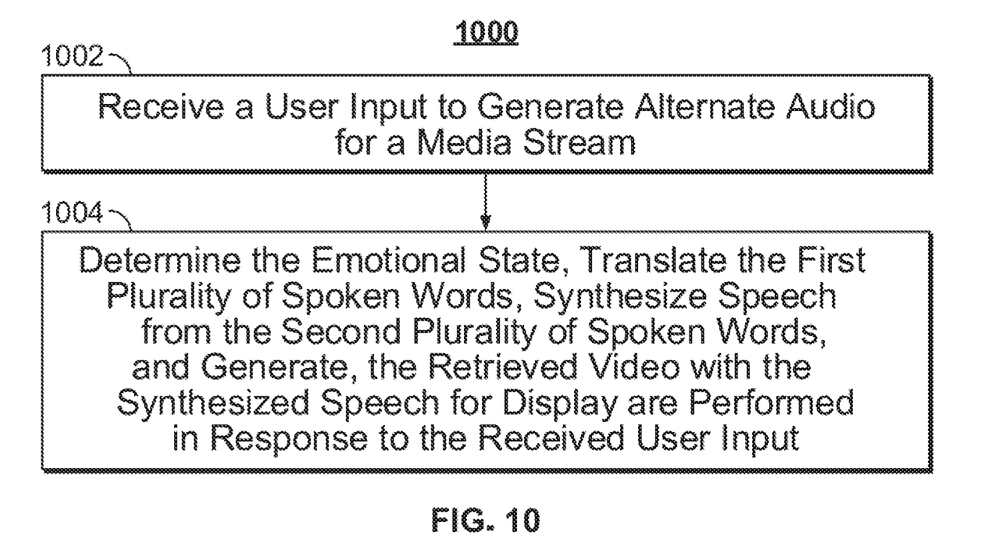
FIG. 10 is a flowchart of a detailed illustrative process for generating an alternate audio track in response to receiving user input, in accordance with some embodiments of the disclosure.

FIG. 10 is a flowchart of a detailed illustrative process for generating an alternate audio track in response to receiving user input, in accordance with some embodiments of the disclosure. Many elements of process 1000 have been described above with respect to FIG. 1, and those descriptions have full force and effect with respect to the below description of process 1000, and thus details on previously-described elements are omitted for the sake of brevity.

At 1002, control circuitry 204 receives a user input to generate alternate audio for a media stream. In some embodiments, the process of generating the alternate audio track is triggered by receiving an input from a user. The input received from the user, may also include a second language in which the alternate audio track should be generated in.

At 1004, control circuitry 204 determines the emotional state, translates the first plurality of spoken words, synthesizes speech from the second plurality of spoken words, and generates the retrieved video with the synthesized speech for display in response to the received user input.

It should be noted that processes 400-1000 or any step thereof could be performed on, or provided by, any of the devices shown in FIGS. 2-3. For example, the processes may be executed by control circuitry 204 (FIG. 2) as instructed by a notification delivery application implemented on media device 302 and/or processing server 308. In addition, one or more steps of a process may be incorporated into or combined with one or more steps of any other process or embodiment (e.g., steps from process 400 may be combined with steps from process 800). In addition, the steps and descriptions described in relation to FIGS. 4-10 may be done in alternative orders or in parallel to further the purposes of this disclosure. For example, each of these steps may be performed in any order or in parallel or substantially simultaneously to reduce lag or increase the speed of the system or method.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for generating alternate audio for a media stream, the method comprising:
   receiving media comprising video and audio, wherein the audio comprises a first plurality of spoken words in a first language;
   buffering the media in a buffer as it is received;
   retrieving audio from the buffer:
     determining an emotional state expressed by the first plurality of spoken words based on a first set of non-linguistic characteristics associated with the first plurality of spoken words of the first language;
     identifying a name of an actor performing in the media that utters the first plurality of spoken words based on metadata associated with the media;

identifying vocal characteristics of the identified actor that utters the first plurality of spoken words by:
  searching, based on the name, for another movie featuring the actor;
  extracting a voice sample from the another movie featuring the actor; and
  calculating vocal characteristics based on the voice sample from the another movie featuring the actor;
translating the first plurality of spoken words of the first language into a second plurality of spoken words of a second language;
generating a translated audio, based on the second plurality of spoken words of the second language and the vocal characteristics of the actor that utters the first plurality of spoken words, wherein the translated audio comprises a second set of non-linguistic characteristics associated with the determined emotional state;
retrieving video from the buffer; and
generating for output the retrieved video and the translated audio, wherein the translated audio is output with the video instead of the first plurality of spoken words.

2. The method of claim 1, wherein translating the first plurality of spoken words into the second plurality of spoken words of the second language comprises:
  transcribing the first plurality of spoken words in the first language;
  translating the transcribed words of the first language into words of the second language; and
  wherein generating the translated audio comprises synthesizing a speech from the translated words of the second language.

3. The method of claim 2, wherein translating the transcribed words of the first language into words of the second language comprises:
  retrieving, from a language translation database, rules of grammar of the first language;
  determining, using the rules of grammar of the first language, parts of speech of the translated words of the first language;
  retrieving, from the language translation database, rules of grammar of the second language; and
  translating the translated words of the first language into words of the second language based on the parts of speech assigned to the transcribed words of the first language and rules of grammar of the second language.

4. The method of claim 1, wherein determining the emotional state expressed by the first plurality of spoken words comprises:
  determining whether the first plurality of spoken words contain emotion identifiers;
  in response to determining that the first plurality of spoken words contain emotion identifiers:
    comparing the emotion identifier to a plurality of emotional identifiers stored in a database; and
    determining the emotional state expressed by the first plurality of spoken words based on matches resulting from the comparison.

5. The method of claim 1, wherein determining the emotional state expressed by the first plurality of spoken words further comprises:
  determining the first set of non-linguistic characteristics associated with the first plurality of spoken words;
  comparing the first set of non-linguistic characteristics to a particular set of non-linguistic characteristics stored in a language translation database; and
  determining the emotional state expressed by the first plurality of spoken words based on matches resulting from the comparison.

6. The method of claim 5, wherein generating the translated audio from the second plurality of spoken words comprises:
  determining, based on the first set of non-linguistic characteristics, a gender of the actor that utters the first plurality of spoken words;
  retrieving, from a language translation database, the second set of non-linguistic characteristics based on the determined gender of the actor; and
  synthesizing the speech using the second set of non-linguistic characteristics.

7. The method of claim 5, wherein generating the translated audio from the second plurality of spoken words comprises:
  determining, based on the first set of non-linguistic characteristics, an ethnicity of the actor that utters the first plurality of spoken words;
  retrieving, from a language translation database, the second set of non-linguistic characteristics based on the determined ethnicity of the actor; and
  synthesizing the speech using the second set of non-linguistic characteristics.

8. The method of claim 5, wherein the particular set of non-linguistic characteristics includes at least one of pitch, timbre, tone, accent, rhythm, or volume.

9. The method of claim 1, wherein generating the translated audio from the second plurality of spoken words comprises:
  determining an identity of the person that utters the first plurality of spoken words;
  retrieving, from a language translation database, a plurality of voice samples of the actor;
  calculating a vocal fingerprint of the actor using the plurality of voice samples; and
  synthesizing speech based on the calculated vocal fingerprint.

10. The method of claim 1, wherein:
  the method comprises receiving an input to generate alternate audio for a media stream; and
  determining the emotional state, translating the first plurality of spoken words, synthesizing speech from the second plurality of spoken words, and generating, the retrieved video with the synthesized speech for display are performed in response to the received user input.

11. The method of claim 1, wherein the first set of non-linguistic characteristics is associated with the determined emotional state in the first language; and the second set of non-linguistic characteristics is associated with the determined emotional state in the second language and is different from the first set of non-linguistic characteristics associated with the determined emotional state in the first language.

12. A system for generating alternate audio for a media stream, the system comprising control circuitry configured to:
  receive media comprising video and audio, wherein the audio comprises a first plurality of spoken words in a first language;
  buffer the media in a buffer as it is received;
  retrieve audio from the buffer:
    determine an emotional state expressed by the first plurality of spoken words based on a first set of non-linguistic characteristics associated with the first plurality of spoken words of the first language;

identify a name of an actor performing in the media that utters the first plurality of spoken words based on metadata associated with the media;
identify vocal characteristics of the identified actor that utters the first plurality of spoken words by:
  searching, based on the name, for another movie featuring the actor;
  extracting a voice sample from the another movie featuring the actor; and
  calculating vocal characteristics based on the voice sample from the another movie featuring the actor;
translate the first plurality of spoken words of the first language into a second plurality of spoken words of a second language;
generate a translated audio, based on the second plurality of spoken words of the second language and the vocal characteristics of the actor that utters the first plurality of spoken words, wherein the translated audio comprises a second set of non-linguistic characteristics associated with the determined emotional state;
retrieve video from the buffer; and
generate for output the retrieved video and the translated audio, wherein the translated audio is output with the video instead of the first plurality of spoken words.

13. The system of claim 12, wherein the control circuitry, when translating the first plurality of spoken words into the second plurality of spoken words of the second language is further configured to:
transcribe the first plurality of spoken words in the first language;
translate the transcribed words of the first language into words of the second language; and
wherein generating the translated audio comprises synthesizing a speech from the translated words of the second language.

14. The system of claim 13, wherein the control circuitry, when translating the transcribed words of the first language into words of the second language is further configured to:
retrieve, from a language translation database, rules of grammar of the first language;
determine, using the rules of grammar of the first language, parts of speech of the translated words of the first language;
retrieve, from the language translation database, rules of grammar of the second language; and
translate the translated words of the first language into words of the second language based on the parts of speech assigned to the transcribed words of the first language and rules of grammar of the second language.

15. The system of claim 12, wherein the control circuitry, when determining the emotional state expressed by the first plurality of spoken words is further configured to:
determine whether the first plurality of spoken words contain emotion identifiers; and
in response to determining that the first plurality of spoken words contain emotion identifiers:
compare the emotion identifier to a plurality of emotional identifiers stored in a database; and
determine the emotional state expressed by the first plurality of spoken words based on matches resulting from the comparison.

16. The system of claim 12, wherein control circuitry, when determining, the emotional state expressed by the first plurality of spoken words is further configured to:
determine the first set of non-linguistic characteristics associated with the first plurality of spoken words;
compare the first set of non-linguistic characteristics to a particular set of non-linguistic characteristics stored in a language translation database; and
determine the emotional state expressed by the first plurality of spoken words based on matches resulting from the comparison.

17. The system of claim 16, wherein the control circuitry, when generating the translated audio from the second plurality of spoken words is further configured to:
determine, based on the first set of non-linguistic characteristics, a gender of the actor that utters the first plurality of spoken words;
retrieve, from a language translation database, the second set of non-linguistic characteristics based on the determined gender of the actor; and
synthesize the speech using the second set of non-linguistic characteristics.

18. The system of claim 16, wherein the control circuitry, when generating the translated audio from the second plurality of spoken words is further configured to:
determine, based on the first set of non-linguistic characteristics, an ethnicity of a actor that utters the first plurality of spoken words;
retrieve, from a language translation database, the second set of non-linguistic characteristics based on the determined ethnicity of the actor; and
synthesize the speech using the second set of non-linguistic characteristics.

19. The system of claim 12, wherein the control circuitry, when generating the translated audio from the second plurality of spoken words is further configured to:
determine an identity of the actor that utters the first plurality of spoken words;
retrieve, from a language translation database, a plurality of voice samples of the actor;
calculate a vocal fingerprint of the actor using the plurality of voice samples; and
synthesize speech based on the calculated vocal fingerprint.

20. The system of claim 12, wherein the control circuitry is further configured to:
receive an input to generate alternate audio for a media stream; and determine the emotional state, translate the first plurality of spoken words, synthesize speech from the second plurality of spoken words, and generate, the retrieved video with the synthesized speech for display are performed in response to the received user input.

21. A non-transitory computer readable medium comprising instructions for generating alternate audio for a media stream, that when executed causes the control circuitry to:
receive media comprising video and audio, wherein the audio comprises a first plurality of spoken words in a first language;
buffer the media in a buffer as it is received;
retrieve audio from the buffer:
  determine an emotional state expressed by the first plurality of spoken words based on a first set of non-linguistic characteristics associated with the first plurality of spoken words of the first language;
  identify a name of an actor performing in the media that utters the first plurality of spoken words based on metadata associated with the media;
  identify vocal characteristics of the identified actor that utters the first plurality of spoken words by:
    searching, based on the name, for another movie featuring the actor;

extracting a voice sample from the another movie featuring the actor; and calculating vocal characteristics based on the voice sample from the another movie featuring the actor;

translate the first plurality of spoken words of the first language into a second plurality of spoken words of a second language;

generate a translated audio, based on the second plurality of spoken words of the second language and the vocal characteristics of the actor that utters the first plurality of spoken words, wherein the translated audio comprises a second set of non-linguistic characteristics associated with the determined emotional state;

retrieve video from the buffer; and generate for output the retrieved video and the translated audio, wherein the translated audio is output with the video instead of the first plurality of spoken words.

22. The non-transitory computer readable medium of claim 21, further comprising instructions that when executed by the control circuitry causes the control circuitry to translate the first plurality of spoken words into the second plurality of spoken words of the second language, by:

transcribing the first plurality of spoken words in the first language;

translating the transcribed words of the first language into words of the second language; and wherein generating the translated audio comprises synthesizing a speech from the translated words of the second language.

* * * * *